United States Patent [19]
Mazo et al.

[11] Patent Number: 5,939,522
[45] Date of Patent: *Aug. 17, 1999

[54] PRODUCTION OF POLYSUCCINIMIDE AND POLYASPARTATE IN THIOETHER SOLVENTS

[75] Inventors: Grigory Ya. Mazo; Jacob Mazo, both of Skokie; Barney Vallino, Naperville; Robert J. Ross, Elmhurst, all of Ill.

[73] Assignee: Donlar Corporation, Bedford Park, Ill.

[ * ] Notice: This patent is subject to a terminal disclaimer.

[21] Appl. No.: 08/924,276

[22] Filed: Sep. 5, 1997

[51] Int. Cl.$^6$ .................................................... C08G 73/10
[52] U.S. Cl. ......................... 528/363; 528/328; 528/373; 525/418; 525/420
[58] Field of Search .................................... 428/328, 363, 428/373; 525/420, 418

[56] References Cited

U.S. PATENT DOCUMENTS

| | | | |
|---|---|---|---|
| 5,329,020 | 7/1994 | Kalota et al. | 548/520 |
| 5,484,945 | 1/1996 | Nagatomo et al. | 548/520 |
| 5,508,434 | 4/1996 | Batzel et al. | 548/520 |
| 5,756,595 | 5/1998 | Mazo et al. | 525/420 |

FOREIGN PATENT DOCUMENTS

| | | |
|---|---|---|
| 08059821 | 3/1996 | Japan . |
| 08277329 | 10/1996 | Japan . |
| WO96/19524 | 6/1996 | WIPO . |

OTHER PUBLICATIONS

Kakuchi T., et al., Synthesis and Characterization of Poly(succinimide–co–6–aminocaproic acid) by Acid–Catalyzed Polycondensation of L–Aspartic Acid and 6–Aminocaproic Acid, *Journal of Polymer Science: Part A: Polymer Chemistry*, 35, 285–289 (1997).

Nakato T., et al., Novel Synthetic Method for High Molecular Weight Poly(succinimide) by Acid–catalyzed Polycondensation of L–Aspartic Acid, *Polymer Preprints*, 37(1), 555–556, Div. of Polymer Chemistry, ACS (1996).

Tomida M., et al., Novel method of synthesizing poly(succinimide) and its copolymeric derivatives by acid–catalyzed polycondensation of L–aspartic acid, *Polymer*, 37(19), 4435–4437 (1996).

Kakuchi T, et al., Synthesis and Characterization of Poly(succinimide–co–6–aminocaproic acid) by Acid–Catalyzed Polycondensation of L–Aspartic Acid and 6–Aminocaproic Acid, *Polymer Preprints*, 37(1), 561–562, Div. of Polymer Chemistry, ACS (1996).

*Primary Examiner*—P. Hampton-Hightower
*Attorney, Agent, or Firm*—Olson & Hierl, Ltd.

[57] ABSTRACT

A method for the preparation of a desired molecular weight polysuccinimide by the catalytic polymerization of aspartic acid in the presence of a thioether solvent. Polysuccinimide of relatively high weight average molecular weight and high purity can be produced in relatively high yields while employing a relatively low catalyst loading and relatively low temperatures.

25 Claims, No Drawings

PRODUCTION OF POLYSUCCINIMIDE AND POLYASPARTATE IN THIOETHER SOLVENTS

FIELD OF THE INVENTION

This invention relates to a relatively low temperature, solution-phase method for the production of polysuccinimide and polyaspartate in thioether solvents.

BACKGROUND OF THE INVENTION

Polysuccinimides, polyaspartates, as well as co-polymers thereof are becoming increasingly useful as mineral scale inhibitors, plant nutrient absorption enhancers, additives for cosmetics and personal care products, adhesives, anti-redeposition agents for detergents, dispersants, additives for paper-making, corrosion inhibitors, metal working fluids, lubricants for conveyor belts, additives for the prevention of encrustation in sugar manufacture, and tartar preventative agents in toothpaste.

Methods are known for the production of polysuccinimide by the polymerization of aspartic acid in the presence of various catalysts, such as phosphoric acid in addition to oxygen-containing and sulfur-containing dehydrating agents. However, these prior art methods rely on a relatively inefficient process of heat transfer during polymerization, namely the heating of a semi-solid, viscous mixture which is difficult to stir and therefore cannot be heated uniformly. Other disadvantages are the relatively large amount of catalyst and/or dehydrating agent which is required for polymerization to occur and the subsequent removal of excess catalyst. Attempts to perform catalytic polymerizations in a liquid medium have been made (U.S. Pat. No. 5,484,945 to Nagatomo et. al.), but exceedingly high amounts of catalyst were required to achieve the polymerization of the desired high molecular weight products. The synthesis of polysuccinimide by the polycondensation of aspartic acid in various solvents including thioethers, also has been recently described (Nakato et. al. *Polymer Preprints*, vol 37, no. 1034, pg 555–556 [March 1996]).

SUMMARY OF THE INVENTION

An efficient, relatively low temperature solution-phase method of polysuccinimide and polyaspartate production is disclosed. A liquid reaction mixture containing a thioether solvent, at least one catalyst, and aspartic acid is prepared, then heated to an elevated but relatively low temperature. The reaction temperature is sufficient to initiate catalytic polymerization of aspartic acid but is below 200° C. The reaction temperature is maintained within the foregoing range until polysuccinimide is produced.

Polysuccinimide of relatively high weight average molecular weight and relatively high purity can be produced in relatively high yields at relatively low ratios of catalyst to aspartic acid. Co-monomers may be included in the reaction mixture to produce polysuccinimide co-polymers. Metal salts, alternative solvents, and other polymers may be added to modify the properties of the thioether solvent and the subsequent polysuccinimide or polyaspartate product.

The polysuccinimide of the inventive method can then be directly hydrolyzed to polyaspartic acid without removal of the thioether solvent by the addition of an aqueous solution of a strong base like sodium hydroxide. Thus, the synthesis and subsequent hydrolysis can be carried out in one reaction vessel if desired. The amount of product manipulation and/or loss is minimized as a result. In addition, the thioether solvent is can be recycled or reused inasmuch as it is unreactive toward the hydrolysis reagent. A significant reduction in the cost of raw materials can be realized in this manner.

DETAILED DESCRIPTION OF THE INVENTION

Aspartic acid or mixtures of aspartic acid with other co-monomers and at least one catalyst can be dissolved in a thioether solvent and polymerized by the application of heat to form polysuccinimide, or co-polymers thereof, in solution. The polysuccinimide may then be hydrolyzed directly to polyaspartate without removal of the thioether solvent by the addition of an aqueous solution of a strong base. As the solvent is unaffected by the hydrolysis reagents, it may be recycled, i.e., reused in subsequent reactions.

The present inventive method can be carried out as a one-pot reaction, if desired, in a conventional reaction vessel with heating and stirring capabilities. Such reactor vessels are relatively inexpensive, commonly available, and allow high production rates in small plant areas.

In one embodiment of the inventive method, the reaction mixture can be formed by initially adding the aspartic acid, in either L-, D- or DL-isomer form, to a mixture of solvent and catalyst, then heated. Alternatively, a mixture of solvent and catalyst can be preheated then the aspartic acid added to the preheated mixture. In yet another variation, each component of the reaction mixture is mixed with one another in a stepwise manner then heated.

In a particularly preferred embodiment, the solvent is unreactive with respect to the aspartic acid and co-monomer, can solubilize the polysuccinimide, and is commercially available at reasonable cost in sufficient supply amounts. Desirable solvents include sulfolane, methyl sulfolane, dimethyl sulfone, dimethyl sulfolane, methyl ethyl sulfone, and other sulfones containing less than 15 carbons. A presently preferred solvent is sulfolane, which is commercially available from Aldrich Chemical Company (Milwaukee, Wis.).

Thioether solvents useful in the inventive method have a boiling point in the range of about 50° C. to about 350° C., and preferably in the range of about 150° C. to about 300° C. Preferably the thioether solvents are cyclical and have the formula:

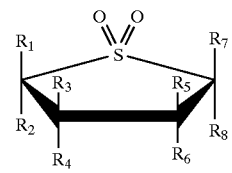

wherein $R_1$–$R_8$ each are hydrogen, methyl, ethyl, propyl, butyl or phenyl. Straight- or branched-chain thioether solvents can be utilized as well, however.

Various inorganic salts may be added to the solvent to modify its properties and those of the resulting polymer. The inclusion of either lithium chloride, lithium sulfate, or poly(ethylene oxide) for example, leads to a higher molecular weight polymer.

The reaction temperature must be sufficiently high to initiate polymerization of the aspartic acid and will vary with operating conditions. The elevated reaction temperature must remain at or below the boiling point of the chosen thioether solvent, however. The reaction temperature for the present purposes usually is in the range of about 50° C. to below 200° C. Temperatures in excess of about 200° C. have an adverse effect on the ultimate molecular weight of the produced polymer. A preferred reaction temperature is in the range of about 130° C. to about 180° C., and especially preferred is the range of about 130° C. to 170° C.

Preferably the reactants remain in solution during the entire polymerization reaction. The reaction pressure can be atmospheric or sub-atmospheric, preferably under a vacuum of at least about −84 kPa (about 25 inches of Hg). If an inert gas atmosphere is used during the reaction, the gas is preferably anhydrous nitrogen or carbon dioxide. Reaction times can vary in the range of about 5 minutes to about 24 hours, preferably in the range of about 30 minutes to about 12 hours. No further treatment is required to obtain polysuccinimide in a relatively high yield of above about 60% and with purity of about 95%.

During the polymerization reaction, the water of condensation preferably can be removed by distillation. The use of reduced pressure, e.g., about −80 kPa to about −95 kPa, during the polymerization reaction allows for faster removal of water generated during polymerization, thereby promoting faster reactions and higher molecular weight products.

Relatively low catalyst loadings were found to produce polysuccinimide of relatively high molecular weight. The ratio of aspartic acid/catalyst can be varied in a range of about 1/1 to about 40/1 w/w, depending upon the desired final product. The preferred ratio of aspartic acid/catalyst is greater than about 1. Mixtures of more than one catalyst can be used to obtain higher molecular weight polysuccinimides.

Catalysts useful for the polymerization of aspartic acid include, without limitation, phosphorus-containing catalysts, sulfur-containing dehydrating agents, oxygen-containing dehydrating agents and mixtures thereof, as well as catalysts disclosed in U.S. Pat. No. 5,508,434 (Batzel et. al.), U.S. Pat. No. 5,142,062 (Knebel et. al.), U.S. Pat. No. 4,646,981 (Ohayon), French Patent No. FR 2712892 (Lepage et. al.), and the like.

Examples of phosphorus-containing catalysts include phosphoric acid, polyphosphoric acid, phosphorous acid, hypophosphorous acid, meta-phosphoric acid, organic amine or inorganic alkali or alkaline earth salts thereof, alkali or alkaline earth or amine salts of alkyl or aryl phosphoric acids, phosphoric anhydride, pyrophosphoric acid, and mixtures thereof. In sulfolane solvents, catalysts such as phosphorous acid, meta-phosphoric acid, hypophosphorous acid and mixtures thereof are especially preferred, as are the salts of such acids. It has been noted that the use of hydrochloric acid (about 3% by wt.) in conjunction with the catalyst is useful for modulating the molecular weight and other properties of the polysuccinimide.

Examples of sulfur-containing dehydrating agents and oxygen-containing dehydrating agents include sulfur trioxide anhydride and sulfur trioxide precursors, complexes of sulfur trioxide with amines or amides, and alkyl or aryl sulfonic acids, alkali, alkaline earth or amine salts of alkyl or aryl sulfonic acids, anhydrosulfuric acids and salts thereof, sulfurous acid, alkali, alkaline earth or amine salts thereof and dehydrating agents.

Particularly preferred sulfur trioxide precursors include sulfur oxygen acids, organic amine and inorganic salts of sulfur oxygen acids, coordinations complexes of sulfur trioxide and aliphatic or heterocyclic amines, complexes of sulfur trioxide and water-miscible aprotic solvents and mixtures thereof.

Preferred sulfur oxygen acids are sulfuric acid, fuming sulfuric acid, polysulfuric acid, alkyl- or aryl-substituted sulfonic acid, sulfamic acid, pyrosulfuric acid and inorganic or organic salts of the foregoing acids and mixtures thereof.

The method of the present invention can be used to produce co-polymers of polysuccinimide by the co-polymerization of aspartic acid with other mono-functional, di-functional or multi-functional monomers. Useful co-monomers include those which contain sulfonate, carboxyl, carboxylic anhydride, hydroxyl, and amine functional groups and combinations thereof. Examples of such co-monomers include: polybasic carboxylic acids or anhydrides thereof, fatty acids, polybasic hydroxycarboxylic acids, monobasic polyhydroxycarboxylic acids, alcohols, monoamines, polyamines, alkoxylated alcohols, alkoxylated amines, alkoxylated diamines, alkoxylated triamines, amino sugars, carbohydrates, sugar carboxylic acids, amino acids, aminocarboxylic acids, lactams, lactones, diols, triols, polyols, unsaturated monocarboxylic acids, unsaturated dicarboxylic acids, and unsaturated tricarboxylic acids and anhydrides thereof.

Other co-monomers include maleic acid, maleic anhydride, maleamic acid, fumaric acid, citraconic acid, citraconic anhydride, itaconic acid, itaconic anhydride, aconitic acid, malic acid, lactic acid, citric acid, oxalic acid, glycolic acid, tartaric acid, succinic acid, adipic acid, butanetetracarboxylic acid or anhydride thereof, gluconic acid, glucuronic acid, glucaric acid, sulfosuccinic acid, phosphinicosuccinic acid, phosphonosuccinic acid, chlorosuccinic acid, 2,3-epoxysuccinic acid, 2,3-epoxysuccinic anhydride, iminodiacetic acid, nitrilotriacetic acid, ethylenediaminetetraacetic acid (EDTA), stearic acid, palmitic acid, cyclohexanedicarboxylic acid and anhydride thereof, crotonic acid, sorbitol, glucose, fructose, sucrose, maltose, amino acids such as glycine, alanine, glutamic acid, asparagine, lysine, serine, threonine, cystine, cysteine and the like, ethylenediamine, diethylenetriamine, triethylenetetramine, polyvinylamine, 1,6-diaminohexane, cystamine, stearylamine, laurylamine, glucosamine, the series of polyoxyalkylene amines sold under the trademark JEFFAMINES by Huntsman Corporation (Austin, Tex.), 6-aminocaproic acid, 4-aminobutyric acid, diaminocyclohexane, urea, carbohydrazide, melamine, hydrazine, hydroxylamine, ammonia, cyanuric acid, acrylic acid, methacrylic acid, methylene malonic acid, malonic acid, melamine-formaldehyde resins, urea-formaldehyde resins and polyvinyl alcohol.

Co-polymerization reactions can be carried out in two steps by first forming a reaction mixture containing about 0.1 mole % to about 99.9 mole % of aspartic acid, about 99.9 mole % to about 0.1 mole % co-monomer and about 0.01 weight % to about 100 weight % of catalyst based on the combined total weight of aspartic acid and co-monomers and second, by heating the reaction mixture to an elevated temperature for a period of time sufficient for polymerization to occur. The thioether solvents for the co-polymerization process can be the same as those for the homopolymerization process, as can be the temperature range and polymerization time.

Polysuccinimide produced by the inventive method can have a weight average molecular weight (MW) in the range of about 3,000 to about 50,000, a number average molecular weight (Mn) in the range of about 1,000 to about 7,000 and a zero average molecular weight (Mz) in the range of about 8,000 to about 150,000. The molecular weight can be controlled by varying one or more of the following reaction conditions: choice of solvent, concentration of reactants, polymerization temperature, polymerization time, reaction pressure, water removal rate, catalyst, and weight ratio of aspartic acid monomer or co-monomer to catalyst.

The polysuccinimide product can be recovered by precipitation through the addition of a triturating solvent which is miscible with the thioether solvent but is non-solvating for the polysuccinimide product. Useful triturating solvents include without being limited to ketones, alcohols, esters, nitriles, water, and hydrocarbons. Acetone is particularly preferred. However, the following solvents were not found suitable for precipitation purposes: dimethyl sulfoxide (DMSO), N,N-dimethyl acetamide (DMAC), 1-methyl-1-pyrrolidoninone, glycerine, caprolactam, caprolactone, and triacetin. The polysuccinimide product can also be isolated by other solvent separation techniques, such as flash evaporation or distillation.

The polysuccinimides produced by the present inventive methods can be used directly or can be hydrolyzed to produce polyaspartates or co-polymers of polyaspartates. In fact, an aqueous solution of sodium hydroxide may be directly added to the reaction mixture in sulfolane solvent after polymerization is complete in order to rapidly and quantitatively hydrolyze the polysuccinimide to sodium polyaspartate. The sulfolane solvent is unreactive toward sodium hydroxide, and thus may be directly recycled for another reaction.

The use of solution polymerization in the inventive method allows a much higher degree of control over the molecular weight of the product. Since small quantities of catalyst can be used, the use of more expensive, efficient catalysts is permitted without significant cost increases. The consistency and homogeneity of the reaction product is also greatly improved. As presently practiced, the inventive method produced polysuccinimides of very low color to no color. Polyaspartates derived from these polysuccinimides were also of low color.

The molecular weight of the polysuccinimide was determined by base hydrolysis with aqueous sodium hydroxide forming the sodium salt of polyaspartic acid. The number average molecular weight (Mn), weight average molecular weight (MW), and the zero average molecular weight (Mz) of the sodium polyaspartate were determined by Gel Permeation Chromatography (GPC) analysis, with reference to sodium polyacrylate standards. The percent aspartic monomer was determined by titration with perchloric acid in a mixed solvent of acetic acid and formic acid.

The purity of the polysuccinimide product was determined by subtracting the monomer content from 100%. Lack of excess crosslinking in the polymer product was determined by NMR spectroscopy.

The following Example employs generally preferred materials to further illustrate the inventive method but is not intended to be limiting. The L-form of aspartic acid (Nanjing Jinke, China) was used. The formation of polysuccinimide was confirmed by Infrared Spectroscopy (IR) analysis. The solid reaction product was collected by filtration, weighed, and the yield was calculated as a percentage of theoretical yield.

EXAMPLE 1

Sulfolane (25.10 g) was placed in a stirred reactor flask of about 50 ml capacity. The reactor was equipped with a magnetic stirring bar, a thermometer, a condenser, and a port for introducing gas.

Next, a polyphosphoric acid catalyst (82–86% by weight %, 1.01 g) was added to the sulfolane, with stirring to form an acidic solution. Aspartic acid (5.09 g) was then added to this acidic solution with stirring to form a reaction mixture having an aspartic acid/catalyst ratio of about 5.04/1 w/w.

Anhydrous nitrogen gas flow through the flask was begun while the temperature of the reaction mixture was elevated to about 175° C. and maintained at that temperature with stirring for a polymerization period of about 0.66 hours. During this polymerization period, it was noted that all solids dissolved and a homogeneous solution was formed.

At the end of the polymerization period, the temperature of the reaction mixture was cooled to ambient temperature, about 25° C. The product was then triturated with about 250 ml acetone. The precipitate was recovered by filtration and was washed with water then acetone. The solid was dried in a vacuum oven at a temperature of about 60° C. for about 1 hour.

The identity of the product was confirmed as polysuccinimide by Infrared Spectroscopy (IR) analysis. The color of the polysuccinimide product was light tan. A portion of the product was hydrolyzed to sodium polyaspartate by the addition of aqueous sodium hydroxide.

The sodium polyaspartate solution was found to have number average molecular weight (Mn) of 2085, weight average molecular weight (MW) of 5105, and zero average molecular weight (Mz) of 8802. Based on the weight of the product, the theoretical yield was 52.8%, and the purity of the polysuccinimide was 95.5%.

EXAMPLE 2

The general procedure of EXAMPLE 1 was followed with differences noted in TABLE 1 below. Instead of an inert atmosphere of nitrogen, vacuum was applied during the reaction. The polysuccinimide product was not precipitated but directly hydrolyzed from the solvent by the addition of about 5.14 g of aqueous sodium hydroxide (50% w/w). Water was removed by vacuum distillation and the solid material was removed by filtration. The resulting powder was washed with acetone then dried in a vacuum oven overnight.

EXAMPLES 3–11

The procedure for EXAMPLES 3–11 was that of EXAMPLE 1 with the exceptions noted in TABLE 1. Instead of an inert atmosphere of nitrogen, a vacuum (−88 kPa to −96 kPa) was applied during the reaction. In addition, the reaction was performed in a relatively larger flask (100 ml).

EXAMPLE 12

The procedure according to EXAMPLE 2 was followed with differences noted in TABLE 1. Potassium hydroxide was utilized for hydrolysis instead of sodium hydroxide.

EXAMPLE 13

The procedure of EXAMPLE 2 was followed with the exceptions listed in TABLE 1. In addition, a larger flask (500 ml) was used for the experiment.

EXAMPLE 14

The procedure of EXAMPLE 2 was followed with the exceptions listed in TABLE 1. No activator was added to the reaction mixture.

EXAMPLE 15–16

The procedure for EXAMPLES 15–16 was that of EXAMPLE 2 with the exceptions noted in TABLE 1. A non-sulfolane solvent was used in these experiments. Vacuum (−96 kPa) was applied during the reaction. In addition, the reaction was performed in a larger flask (100 ml).

EXAMPLE 17–20

The procedure of EXAMPLE 2 was followed with the exceptions listed in TABLE 1. Vacuum (−96 kPa) was applied during the reaction. Alternate activators were added to the reaction mixtures.

EXAMPLES 21–23

The procedure for EXAMPLES 21–23 was that of EXAMPLE 1 with the exceptions noted in TABLE 1. In EXAMPLES 21–23, no activator was added although co-monomer was added in EXAMPLES 22–23. Instead of an inert atmosphere of nitrogen, vacuum was applied during the reaction. In addition, the reaction was performed in a larger flask (100 ml).

EXAMPLES 24–27

This series of EXAMPLES illustrates the polymerization reaction with the inclusion of metal salts and/or polymer matrices. TABLE 1 list the specific experimental details.

The reaction was performed in a mechanically stirred 500 ml spherical multi-neck flask. The flask was equipped with a mechanical stirrer, vacuum port, thermocouple temperature controller, short-path distillation head with receiving flask, and a heating mantle. The flask was first charged with sulfolane (200 g), then 3.0 g of an aqueous solution of phosphoric acid (85%) was added. The additional components (salts, polymers) were then added. Aspartic acid (40.0 g) was added to the flask, then vacuum (−84 kPa to −90 kPa) and heat were applied. The reaction was allowed to proceed for about 2.5 to about 3.5 hours. The product was cooled to room temperature, then was precipitated with a triturating solvent. The precipitated polysuccinimide was isolated by filtration, washed, then dried in a vacuum oven for about 1 to about 3 hours at a temperature in the range of about 60° to about 80° C. at about −95 kPa.

EXAMPLES 28–36

This series of EXAMPLES illustrates the polymerization reaction with the use of phosphorous-containing acids, excluding phosphoric acid and polyphosphoric acid. The procedure followed in EXAMPLES 24–27 was substantially followed with the exceptions noted in TABLE 1. Applied vacuum was about −90 kPa.

EXAMPLES 37–48

This series of EXAMPLES illustrates the polymerization reaction run in an advanced reactor system as described below.

The advanced reactor system was composed of a glass reactor head and body having external feed capacity and outlets for accessories. The reactor head was joined to the body by a grease-free seal. The reactor body was either a 500 ml or 2000 ml capacity vessel which was placed into a heating mantle. The stirring mechanism was a Teflon blade mounted onto a glass rod. For temperature control, a thermocouple was attached to a temperature controller with the probe positioned in the liquid reaction mixture. Solids were added to the reaction while under vacuum (about −90 kPa) by means of a screw-feeding funnel. A short-path distillation head with collection flask was used for water removal. A sparge tube was attached to a volumetric gas controller and the outlet submerged in the liquid reaction mixture. The procedure of EXAMPLES 24–27 was substantially followed with the exceptions noted in TABLE 1. EXAMPLES 42 and 43 were subjected to the "one-pot" hydrolysis procedure of EXAMPLE 2.

Unlike prior EXAMPLES, the use of the advanced reactor system gave products of very low color when lower temperatures (about 140° C.) were utilized.

EXAMPLES 49–53

This series of EXAMPLES illustrates the polymerization reaction with the inclusion of co-polymers of polysuccinimide with other monomers. The procedure followed in EXAMPLES 24–27 was followed with the exceptions noted in TABLE 1.

TABLE 1

Experimental conditions for EXAMPLES of polysuccinimide production.

| Example # | solvent | solvent weight (g) | activator | activator weight (g) | aspartic acid weight (g) | comonomer | comonomer weight (g) | rxn time (h) | rxn temp. (° C.) | MW prod. |
|---|---|---|---|---|---|---|---|---|---|---|
| 1 | sulfolane | 25.10 | polyphosphoric acid | 1.01 | 5.09 | none | n/a | 0.66 | 175 | 5105 |
| 2 | sulfolane | 30.07 | phosphoric acid, 85% | 0.45 | 7.03 | none | n/a | 1.5 | 170 | 1443 |
| 3 | sulfolane | 50.02 | phosphoric acid, 85% | 0.32 | 5.20 | none | n/a | 2.5 | 190 | 3200 |
| 4 | sulfolane | 50.08 | $K_2S_2O_7$ | 1.02 | 10.01 | none | n/a | 2.25 | 175 | 3780 |
| 5 | sulfolane | 50.02 | $NH_4HSO_4$ | 2.01 | 10.01 | none | n/a | 2.25 | 170 | 4936 |
| 6 | sulfolane | 50.08 | $(NH_4)_2HPO4$ | 2.02 | 10.01 | none | n/a | 3 | 190 | 2814 |
| 7 | sulfolane | 50.05 | phosphoric acid, 85% | 5.05 | 10.01 | none | n/a | 1.75 | 180 | 4363 |
| 8 | sulfolane | 50.03 | phosphoric acid, 85% | 2.02 | 10.03 | none | n/a | 2 | 180 | 3443 |
| 9 | sulfolane | 50.00 | phosphoric acid, 85% | 1.05 | 10.05 | none | n/a | 1.75 | 180 | 2651 |
| 10 | sulfolane | 50.03 | phosphoric acid, 85% | 0.57 | 10.02 | none | n/a | 2 | 180 | 2568 |
| 11 | sulfolane | 50.02 | $NH_4HSO_4$ | 2.00 | 10.00 | none | n/a | 1 | 180 | 4229 |
| 12 | sulfolane | 50.04 | phosphoric acid, 85% | 0.60 | 10.05 | none | n/a | 1.3 | 185 | 2147 |
| 13 | sulfolane | 250.01 | phosphoric acid, 85% | 3.10 | 50.03 | none | n/a | 2.25 | 190 | 2919 |
| 14 | sulfolane | 25.08 | none | n/a | 5.04 | none | n/a | 1 | 190 | 133 |
| 15 | dimethyl sulfone | 50.00 | phosphoric acid, 85% | 5.04 | 9.99 | none | n/a | 1.66 | 170 | 3960 |
| 16 | 3-methyl sulfolane | 50.05 | phosphoric acid, 85% | 5.10 | 10.05 | none | n/a | 2 | 175 | 12887 |
| 17 | sulfolane | 25.23 | phosphoric acid, 85% | 1.02 | 5.05 | none | n/a | 2 | 185 | 5726 |
| 18 | sulfolane | 25.00 | triphenyl phosphite | 12.00 | 5.00 | none | n/a | 2 | 170 | 5000 |

TABLE 1-continued

Experimental conditions for EXAMPLES of polysuccinimide production.

| Example # | solvent | solvent weight (g) | activator | activator weight (g) | aspartic acid weight (g) | comonomer | comonomer weight (g) | rxn time (h) | rxn temp. (° C.) | MW prod. |
|---|---|---|---|---|---|---|---|---|---|---|
| 19 | sulfolane | 25.25 | triphenyl phosphite | 12.12 | 5.00 | none | n/a | 2 | 170 | 3529 |
| 20 | sulfolane | 25.00 | triphenyl phosphite | 12.00 | 5.00 | none | n/a | 3 | 100 | 4959 |
| 21 | sulfolane | 60.00 | none | n/a | 5.00 | none | n/a | 1 | 230 | 1099 |
| 22 | sulfolane | 60.00 | none | n/a | 0.00 | mono-ammonium aspartate | 5.00 | 1 | 175 | 1327 |
| 23 | sulfolane | 60.00 | none | n/a | 0.00 | diammonium aspartate | 5.00 | a | 175 | 1043 |
| 24 | sulfolane | 200.00 | phosphoric acid, 85% | 3.00 | 40.00 | none | n/a | 3.5 | 170 | 3173 |
| 25 | sulfolane | 200.00 | phosphoric acid, 85% | 3.00 | 40.00 | none | n/a | 3.5 | 170 | 3836 |
| 26 | sulfolane | 200.00 | phosphoric acid, 85% | 3.00 | 40.00 | none | n/a | 3.5 | 170 | 4928 |
| 27 | sulfolane | 200.00 | phosphoric acid, 85% | 3.00 | 40.00 | none | n/a | 3.5 | 170 | 4861 |
| 28 | sulfolane | 200.00 | phosphorous acid | 5.00 | 40.00 | none | n/a | 2 | 170 | 7101 |
| 29 | sulfolane | 200.00 | phosphorous acid | 2.50 | 40.00 | none | n/a | 2 | 170 | 5288 |
| 30 | sulfolane | 200.00 | phosphorous acid | 5.00 | 40.00 | none | n/a | 3 | 180 | 3618 |
| 31 | sulfolane | 200.00 | phosphorous acid | 10.00 | 40.00 | none | n/a | 2 | 170 | 8517 |
| 32 | sulfolane | 200.00 | phosphorous acid | 10.00 | 40.00 | none | n/a | 1 | 170 | 6911 |
| 33 | sulfolane | 200.00 | phosphorous acid | 10.00 | 40.00 | none | n/a | 4.5 | 170 | 8364 |
| 34 | sulfolane | 200.00 | metaphosphoric acid, substituted with 56–60% $NaPO_3$ | 10.00 | 40.00 | none | n/a | 2 | 170 | 10816 |
| 35 | sulfolane | 200.00 | hypophosphorous acid, 50% in water | 25.50 | 40.00 | none | n/a | 4 | 170 | 6896 |
| 36 | sulfolane | 200.00 | phosphorous acid | 10.00 | 36.00 | 5-sulfo-salicyclic acid dihydrate | 5.00 | 1 | 170 | 4257 |
| 37 | sulfolane | 400.00 | phosphorous acid | 20.00 | 80.00 | none | n/a | 3 | 170 | 10257 |
| 38 | sulfolane | 400.00 | hypophosphorous acid, 50% in water | 50.00 | 80.00 | none | n/a | 2 | 170 | 7674 |
| 39 | sulfolane | 500.00 | phosphorous acid | 20.00 | 80.00 | none | n/a | 4 | 140 | 5844 |
| 40 | sulfolane | 500.00 | phosphorous acid | 20.00 | 80.00 | none | n/a | 4 | 142 | 7473 |
| 41 | sulfolane | 500.00 | phosphorous acid | 20.00 | 80.00 | none | n/a | 4 | 170 | 6703 |
| 42 | sulfolane | 2000.00 | phosphorous acid | 25.00 | 400.00 | none | n/a | 2.5 | 172 | 3645 |
| 43 | sulfolane | 2000.00 | phosphoric acid, 70%, HCl 3% | 40.00 | 400.00 | none | n/a | 2.5 | 172 | 4786 |
| 44 | sulfolane, propylene carbonate | 150.00 each solvent | phosphorous acid | 5.00 | 50.00 | none | n/a | 2.1 | 160 | 10978 |
| 45 | sulfolane, propylene carbonate | 200.00 each solvent | phosphorous acid | 5.00 | 50.00 | none | n/a | 2.5 | 160 | 5115 |
| 46 | sulfolane, butylene carbonate | 200.00 each solvent | phosphorous acid | 5.00 | 50.00 | none | n/a | 3 | 165 | 7865 |
| 47 | sulfolane, diphenyl carbonate | 300.00 and 100.00 | phosphorous acid | 10.00 | 50.00 | none | n/a | 2.5 | 166 | 4017 |
| 48 | sulfolane, ethylhexyl lactate | 400.00 and 100.00 | phosphorous acid | 10.00 | 50.00 | none | n/a | 2.5 | 166 | n/a |
| 49 | sulfolane | 250.00 | phosphoric acid, 85% | 4.00 | 45.00 | fumaric acid | 5.00 | 1.5 | 180 | 2071 |
| 50 | sulfolane | 50.00 | none | n/a | n/a | maleamic acid | 5.00 | 0.3 | 180 | 1026 |
| 51 | sulfolane | 200.00 | phosphorous acid | 10.00 | 36.00 | 5-sulfoisophthalic acid monosodium salt | 4.00 | 0.75 | 180 | 2565 |
| 52 | sulfolane | 200.00 | phosphorous acid | 10.00 | 32.00 | 5-sulfoisophthalic acid monosodium salt | 8.00 | 1 | 170 | 1801 |
| 53 | sulfolane | 200.00 | phosphorous acid | 10.00 | 36.00 | 4-sulfophthalic acid, 50% in water | 8.00 | 1 | 165 | 2059 |

We claim:

1. A solution-phase method for the preparation of polysuccinimide which comprises the steps of:

(a) forming a substantially liquid reaction mixture of a thioether solvent, at least one catalyst, and aspartic acid;

(b) heating said reaction mixture to an elevated reaction temperature sufficient to effect polymerization of the aspartic acid but below 200° C.; and (c) maintaining the heated reaction mixture at the reaction temperature until a polysuccinimide product is formed.

2. The method of claim 1 wherein the thioether solvent is of the formula:

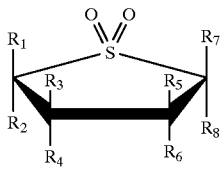

wherein $R_1$–$R_8$ each are hydrogen, methyl, ethyl, propyl, butyl or phenyl.

3. The method of claim 1 wherein the solvent is selected from the group consisting of sulfolane, methyl sulfolane, dimethyl sulfone, dimethyl sulfolane, and methyl ethyl sulfone.

4. The method of claim 1 wherein an inorganic metal salt is added to the reaction mixture.

5. The method of claim 1 wherein the reaction temperature is in the range of about 50° C. to below 200° C.

6. The method of claim 1 wherein the reaction temperature is in the range of about 130° C. to about 180° C.

7. The method of claim 1 wherein the reaction temperature is in the range of about 130° C. to about 170° C.

8. The method of claim 1 wherein the reaction mixture is maintained at the reaction temperature for a time period in the range of about 5 minutes to about 24 hours.

9. The method of claim 1 wherein the reaction mixture is maintained at the reaction temperature for a time period in the range of about 30 minutes to about 12 hours.

10. The method of claim 1 wherein the polymerization reaction is performed under an atmosphere of inert gas.

11. The method of claim 10 wherein the inert gas is anhydrous nitrogen.

12. The method of claim 10 wherein the inert gas is carbon dioxide.

13. The method of claim 1 wherein the polymerization reaction is performed under reduced pressure.

14. The method of claim 1 wherein the weight ratio of aspartic acid to catalyst is greater than about 1.

15. The method of claim 1 wherein the catalyst is selected from the group consisting of phosphorus-containing catalysts, sulfur-containing dehydrating agents, oxygen-containing dehydrating agents and mixtures thereof.

16. The method of claim 1 wherein the catalyst is a phosphorus-containing catalyst selected from the group consisting of phosphoric acid, polyphosphoric acid, phosphorous acid, hypophosphorous acid, metaphosphoric acid, organic amine or inorganic alkali or alkaline earth salts thereof, alkali or alkaline earth or amine salts of alkyl or aryl phosphoric acids, phosphoric anhydride, pyrophosphoric acid, and mixtures thereof.

17. The method of claim 1 wherein hydrochloric acid is present together with the catalyst in the reaction mixture.

18. The method of claim 1 wherein the catalyst is a sulfur trioxide precursor selected from the group consisting of a sulfur oxygen acid, an organic amine salt of a sulfur oxygen acid, an inorganic salt of a sulfur oxygen acid, a coordination complex of sulfur trioxide and an aliphatic or heterocyclic amine, a complex of sulfur trioxide and a water-miscible aprotic solvent, and mixtures thereof.

19. The method of claim 1 wherein the catalyst is a sulfur oxygen acid selected from the group consisting of sulfuric acid, fuming sulfuric acid, polysulfuric acid, an alkyl-substituted sulfonic acid, an aryl-substituted sulfonic acid, sulfamic acid, pyrosulfuric acid, an inorganic or organic salts of the foregoing acids, and mixtures thereof.

20. The method of claim 1 wherein the reaction mixture further includes at least one co-monomer for copolymerization with aspartic acid.

21. The method of claim 1 further comprising the step of recovering said polysuccinimide from said reaction mixture.

22. The method of claim 19 further comprising the step of hydrolyzing the recovered polysuccinimide to polyaspartic acid or a salt thereof.

23. The method of claim 1 wherein the thioether solvent is recycled.

24. The method of claim 1 wherein the polysuccinimide is hydrolyzed directly in the thioether solvent by a strong base.

25. A polysuccinimide produced by the method of claim 1 having a weight average molecular weight in the range of about 3,000 to about 50,000.

* * * * *

UNITED STATES PATENT AND TRADEMARK OFFICE
CERTIFICATE OF CORRECTION

PATENT NO. : 5,939,522
DATED : August 17, 1999
INVENTOR(S) : Grigory Ya. Mazo et al.

It is certified that error appears in the above-indentified patent and that said Letters Patent is hereby corrected as shown below:

Cols. 9 and 10, in TABLE 1:
    Example 23, 9th column, "a" should be -- 1 --.
    Example 30, 11th column, "3618" should be -- 3608 --.

Signed and Sealed this

Seventh Day of March, 2000

Attest:

Q. TODD DICKINSON

*Attesting Officer*     *Commissioner of Patents and Trademarks*